United States Patent
Ensinger

(10) Patent No.: US 7,449,224 B2
(45) Date of Patent: Nov. 11, 2008

(54) SPACER PROFILE FOR AN INSULATED GLAZING UNIT

(75) Inventor: Wilfried Ensinger, Nufringen (DE)

(73) Assignee: Ensinger Kunststofftechnologie GbR, Nufringen (DE)

( * ) Notice: Subject to any disclaimer, the term of this patent is extended or adjusted under 35 U.S.C. 154(b) by 0 days.

(21) Appl. No.: 11/224,575

(22) Filed: Sep. 12, 2005

(65) Prior Publication Data

US 2006/0013979 A1    Jan. 19, 2006

Related U.S. Application Data

(63) Continuation of application No. PCT/EP2004/002649, filed on Mar. 13, 2004.

(30) Foreign Application Priority Data

Mar. 14, 2003    (DE) ................. 103 11 830

(51) Int. Cl.
*B29D 22/00* (2006.01)
*B29D 24/00* (2006.01)
*B32B 3/20* (2006.01)
*E06B 7/12* (2006.01)

(52) U.S. Cl. .............. 428/36.9; 428/34; 428/188; 52/172; 52/786.13; 156/244.13

(58) Field of Classification Search ............. 428/34, 428/304.4, 312.2, 317.9, 328, 331, 402, 36.9, 428/188; 156/107, 109, 244.13; 52/171.3, 52/172, 786.1, 786.13; 210/490, 498; 96/139, 96/154

See application file for complete search history.

(56) References Cited

U.S. PATENT DOCUMENTS

| 3,764,642 | A | | 10/1973 | Boutillier |
| 4,212,137 | A | | 7/1980 | Rue |
| 4,226,063 | A | * | 10/1980 | Chenel ............ 52/172 |
| 4,383,812 | A | | 5/1983 | Calcagni |
| 4,431,691 | A | | 2/1984 | Greenlee |
| 4,950,344 | A | * | 8/1990 | Glover et al. ......... 156/109 |
| 5,436,040 | A | * | 7/1995 | Lafond ............. 428/34 |
| 5,460,862 | A | | 10/1995 | Roller |

(Continued)

FOREIGN PATENT DOCUMENTS

AT    318 881    11/1974

(Continued)

Primary Examiner—Donald Loney
(74) Attorney, Agent, or Firm—Leydig, Voit & Mayer, Ltd.

(57) ABSTRACT

In order to provide a spacer profile for an insulated glazing unit, which profile has a cross-section based on a rectangular shape, is provided with two parallel spaced side walls which, when said insulated glazing unit is assembled, will be placed against the panes of glass to be kept apart from each other, and is further provided with first and second transverse walls which extend between said side walls and of which the first will be adjacent to the edge of the glazing unit and the second will face the space between the panes, with the intention of enabling simple handling of said profile when assembling the spacer frame whilst maintaining a high absorptive capacity for water vapor, it is proposed that said spacer profile comprises a binder matrix and, embedded therein, a particulate adsorbent material for water vapor, and that the binder matrix is permeable to water vapor.

42 Claims, 5 Drawing Sheets

U.S. PATENT DOCUMENTS

| | | | |
|---|---|---|---|
| 5,527,573 A | 6/1996 | Park et al. |
| 5,643,061 A | 7/1997 | Jackson et al. |
| 5,695,392 A | 12/1997 | Kim |
| 5,855,972 A | 1/1999 | Kaeding |
| 5,879,764 A | 3/1999 | Chu et al. |
| 5,945,048 A | 8/1999 | Ensinger |
| 5,993,302 A | 11/1999 | Chen et al. |
| 6,001,453 A | 12/1999 | Lafond |
| 6,030,280 A | 2/2000 | Fruitman |
| 6,068,548 A | 5/2000 | Vote et al. |
| 6,186,880 B1 | 2/2001 | Gonzalez et al. |
| 6,251,215 B1 | 6/2001 | Zuniga et al. |
| 6,264,540 B1 | 7/2001 | Fruitman |
| 6,266,940 B1 * | 7/2001 | Reichert | 52/786.13 |
| 6,276,915 B1 | 8/2001 | Merziger et al. |
| 6,277,008 B1 | 8/2001 | Masuta et al. |
| 6,323,251 B1 | 11/2001 | Perez et al. |
| 6,354,927 B1 | 3/2002 | Natalicio |
| 6,355,341 B1 | 3/2002 | Chaudhary et al. |
| 6,389,779 B1 | 5/2002 | Brunnhofer |
| 6,390,904 B1 | 5/2002 | Gleason et al. |
| 6,390,908 B1 | 5/2002 | Chen et al. |
| 6,439,984 B1 | 8/2002 | Andres |
| 6,471,566 B1 | 10/2002 | Mikhaylich et al. |
| 6,485,358 B2 | 11/2002 | Numoto et al. |
| 6,537,629 B1 | 3/2003 | Ensinger |
| 6,585,850 B1 | 7/2003 | Kenji et al. |
| 6,803,083 B2 | 10/2004 | Ensinger |
| 6,824,458 B2 | 11/2004 | Ensinger |
| 6,913,669 B2 | 7/2005 | Ensinger |
| 2003/0041733 A1 * | 3/2003 | Seguin et al. | 96/108 |

FOREIGN PATENT DOCUMENTS

| | | |
|---|---|---|
| CA | 2408382 A1 | 2/1997 |
| DE | 32 03 631 A1 | 8/1983 |
| DE | 32 27 509 A1 | 1/1984 |
| DE | 33 02 659 A1 | 8/1984 |
| DE | 38 01 564 A1 | 8/1989 |
| DE | 43 31 816 | 3/1995 |
| DE | 195 10 944 C1 | 2/1997 |
| DE | 195 30 838 A1 | 2/1997 |
| DE | 298 14 768 U1 | 1/1999 |
| DE | 198 05 348 A1 | 8/1999 |
| DE | 198 07 454 A1 | 8/1999 |
| DE | 198 27 308 A1 | 12/1999 |
| DE | 696 07 473 T2 | 9/2000 |
| EP | 0 028 775 A1 | 5/1981 |
| EP | 0 430 889 A2 | 6/1991 |
| EP | 0 601 488 B1 | 6/1994 |
| EP | 0 747 167 A2 | 12/1996 |
| EP | 0 841 123 A1 | 5/1998 |
| EP | 0 899 078 A1 | 3/1999 |
| EP | 1 323 468 A1 | 7/2003 |
| FR | 2 095 741 | 2/1972 |
| FR | 2 379 691 | 9/1978 |
| GB | 1 306 197 | 2/1976 |
| JP | 03-240515 A | 10/1991 |
| JP | 11-138615 A | 5/1999 |
| JP | 2001-121411 | 5/2001 |
| WO | WO 03/055593 A1 | 7/2003 |

* cited by examiner

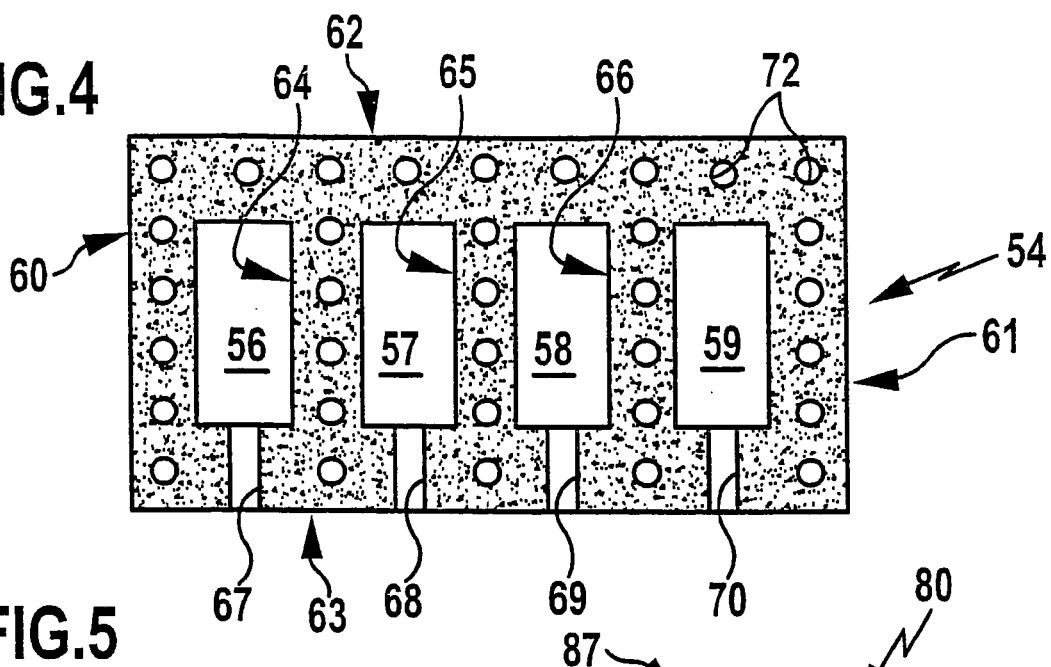
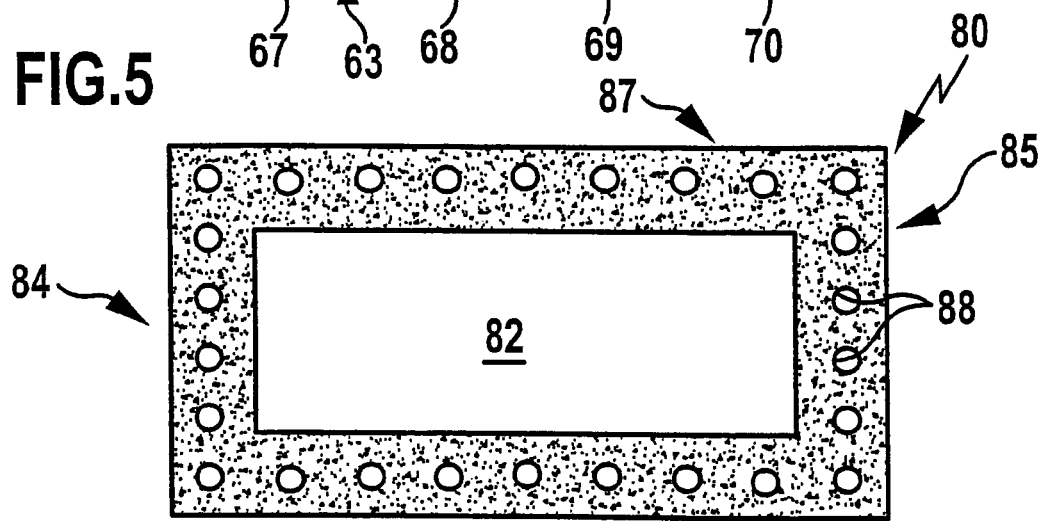
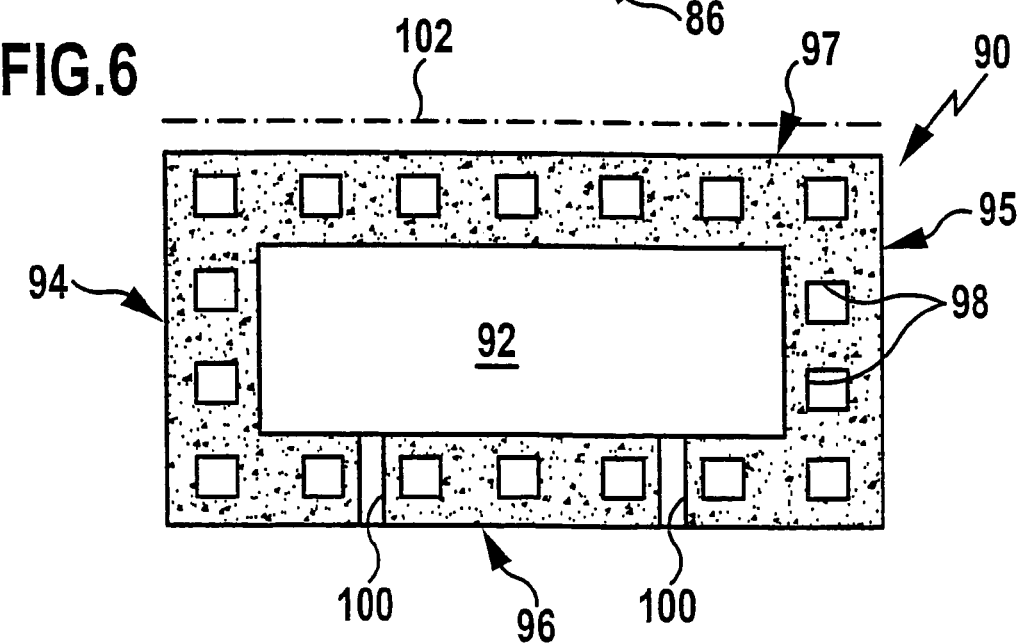

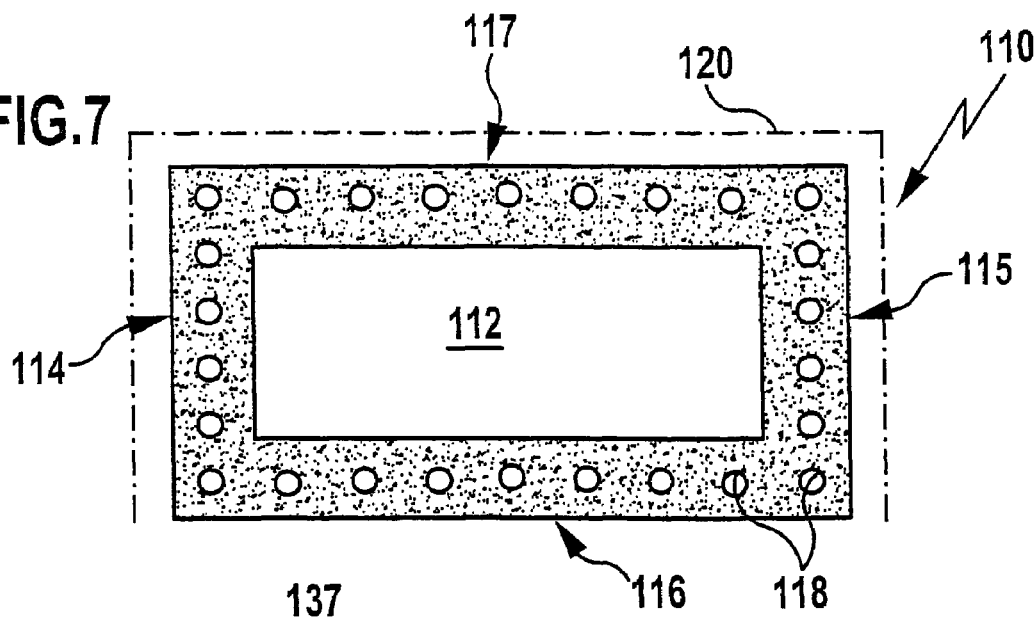
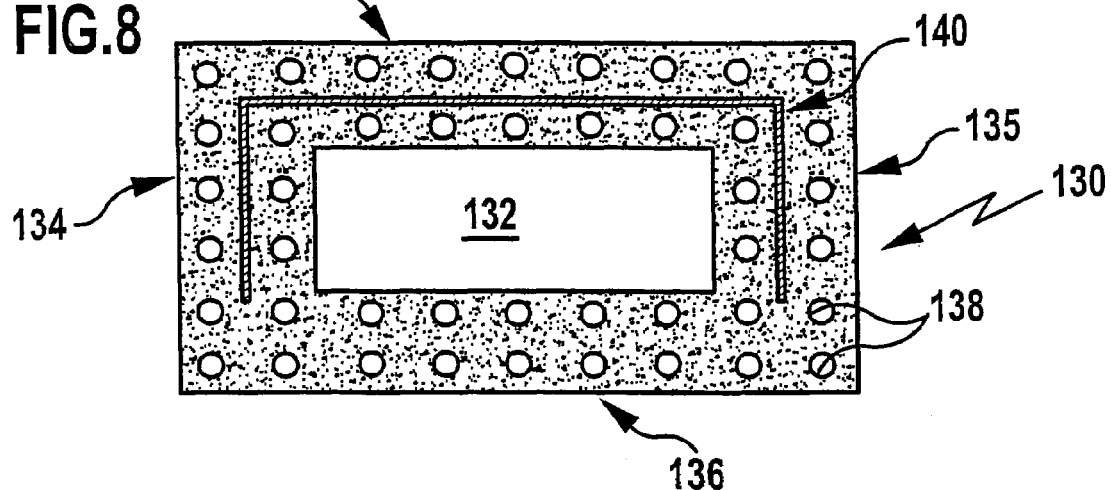
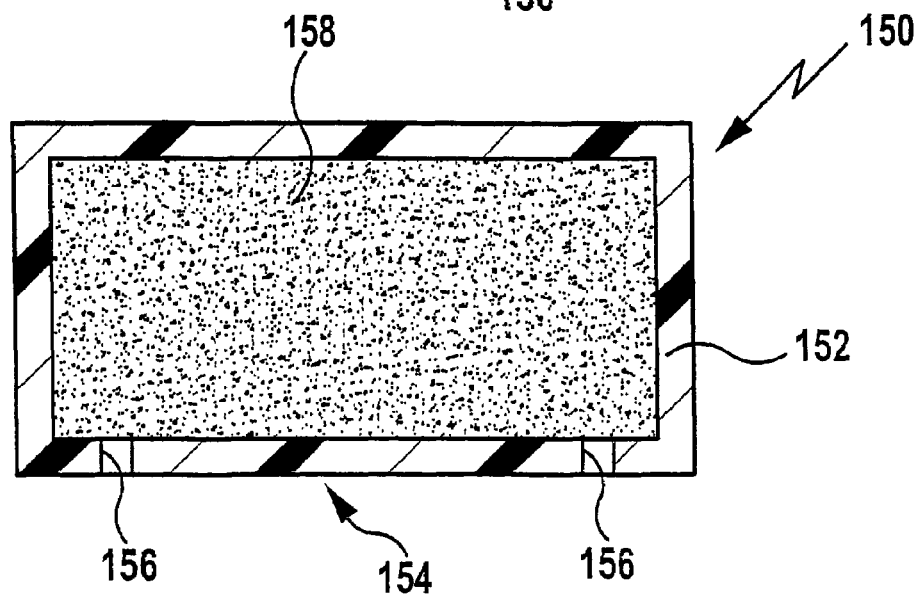

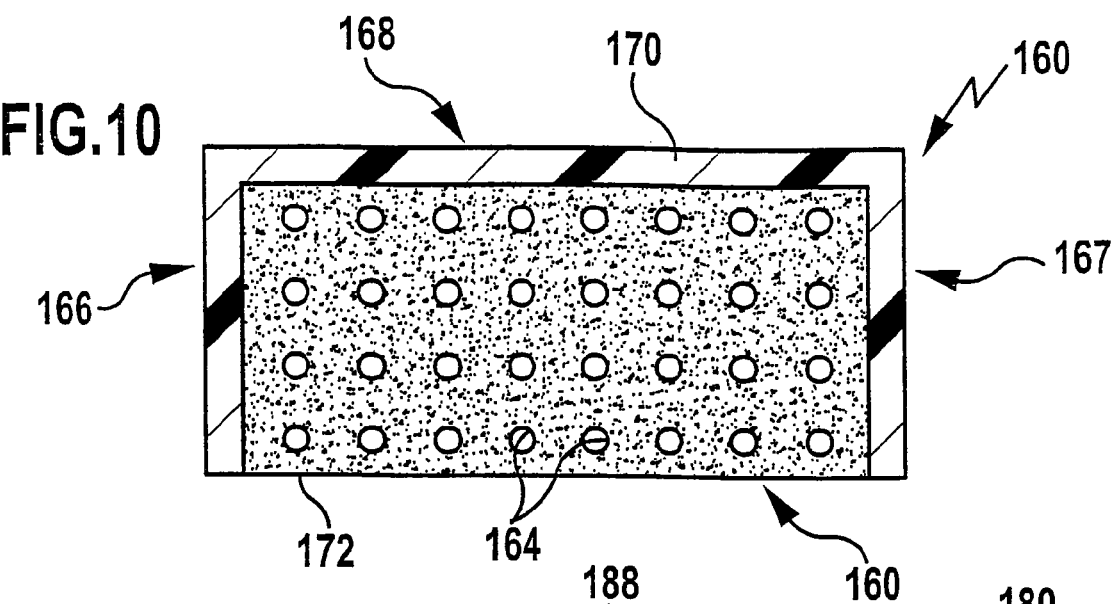
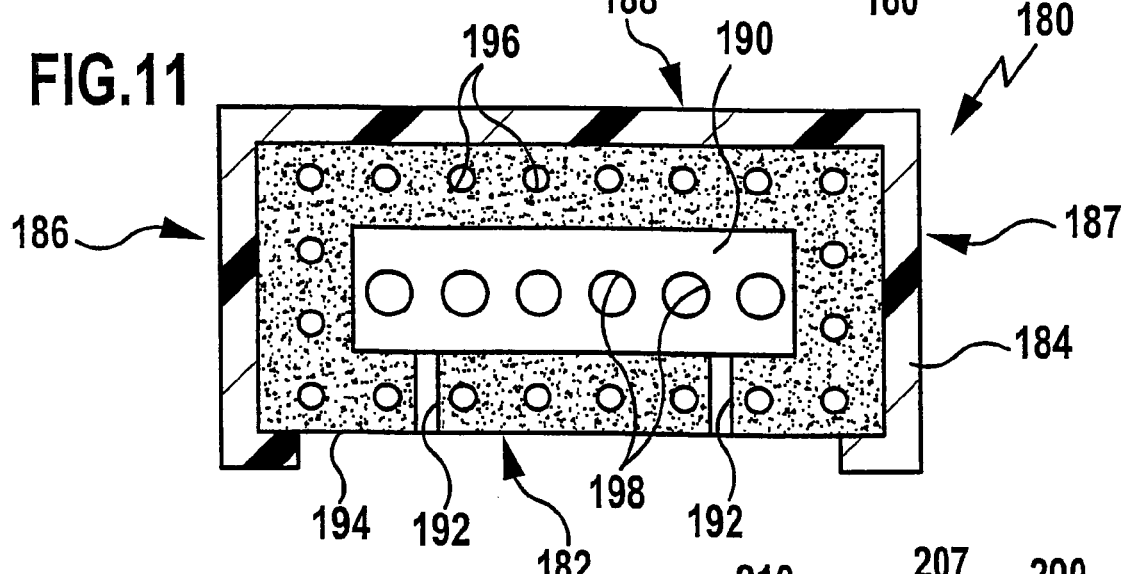
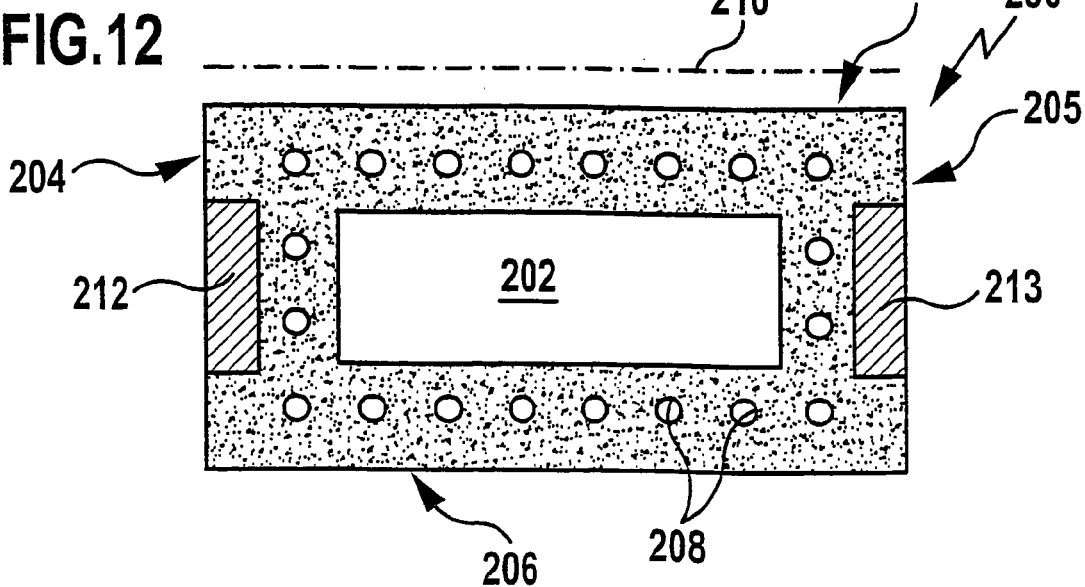

SPACER PROFILE FOR AN INSULATED GLAZING UNIT

This application is a continuation of PCT application No. PCT/EP2004/002649 filed Mar. 13, 2004 and claims priority to German application No. 103 11 830.6 of Mar. 14, 2003, both of which are incorporated herein by reference in their entirety and for all purposes.

BACKGROUND OF THE INVENTION

The present invention relates to a spacer profile for an insulated glazing unit, which profile has a cross-section based on a rectangular shape, is provided with two parallel spaced side walls which, when said insulated glazing unit is assembled, will be placed against the panes of glass to be kept apart from each other, and is further provided with first and second transverse walls which extend between said side walls and of which the first will be adjacent to the edge of the glazing unit and the second will face the space between the panes. By the use of sealants, the space formed between the panes of glass is sealed from the edge of each pane, and the use of a desiccant ensures that said space is kept dry and thus remains free from fogging.

Spacer profiles are frequently used in the form of hollow profiles of metal (stainless steel or aluminum). The profile has two parallel side walls, against which the panes of glass will bear and two transverse walls extending between the side walls in the form of legs, which are substantially at right angles to the side walls of the hollow profile and join them together.

With regard to their bonding strength relative to conventionally employed sealants and their impermeability to the water vapor penetrating from outside into the space between the panes, they meet the demands, but the heat flow near the edges of the panes is excessive on account of the metallic materials used. Even when the space between the panes is filled with a noble gas, such as xenon or krypton, a serious drop in the insulating value, especially in the marginal regions, is observed.

Improvement as regards thermal insulation in the marginal areas of insulated glazing units has been achieved by the proposals made in DE-A 33 02 659, DE-A 127 739, EP-A 0 430 889, EP-A 0 601 488, DE-A 198 05 348, DE-U 298 147 68 and DE-A 198 07 454, which make use of plastics material instead of metallic materials and in some cases use metallic vapor barrier films or metallic reinforcing elements in the side walls and legs and embed the same in the plastics material.

Just as with spacer profiles of metal, spacer profiles of plastics material must still be filled with necessary desiccants when assembling a spacer frame, in order to lower the tendency of the insulated glazing unit to fog.

Depending on the air humidity conditions during filling, the drying agents take up more or less large quantities of water vapor from the production environment while the spacer frame is being filled and are thus incorporated in the final sealed insulated glazing unit with only a fraction of their capacity to bind water vapor for drying, or keeping dry, the space between the panes.

It is an object of the present invention to provide a spacer profile for insulated glazing units which is simple to handle when the spacer frame is being assembled whilst a higher absorption capacity for water vapor is retained by simple means.

SUMMARY OF THE INVENTION

This object is achieved for the above spacer profile according to the invention in that the spacer profile comprises a binder matrix and, embedded therein, particulate water vapor adsorbent material, and in that the binder matrix is permeable to water vapor.

Due to the fact that the particulate adsorbent material is embedded in a binder matrix which is permeable to water vapor, the direct access of water vapor present in the production environment to the particulate adsorbent material is, on the one hand, hindered, since the adsorption rate is governed by the water-vapor permeability, ie the rate at which water vapor passes through the binder matrix to reach the particles of adsorbent material, and is thus considerably slower and consequently less than when water vapor has free access to the particulate adsorbent materials, as is conventionally the case.

Surprisingly, however, the water-vapor permeability of the binder matrix is fully adequate to allow water vapor to penetrate through to the particulate adsorbent material and thus to effect adequate drying of the space between the panes. Since the particulate adsorbent material can adsorb only small quantities of water vapor during the manufacturing process due to the fact that the particles are screened by the binder matrix surrounding them, a distinctly higher adsorption capacity is available in the finished insulated glazing unit for the space between the panes so that ultimately smaller quantities of adsorbent material, based on the volume of the space between the panes, can be used. Since the adsorbent materials are relatively expensive, they are used here in a more economical manner and the production of the spacer frame involves less cost.

At the same time the adsorbent materials used in the spacer profiles of the invention are still sufficiently available for the adsorption of water vapor coming from outside.

Furthermore, the adsorbent material in the spacer profile of the invention may also bind outgassing solvents, plasticizers, or the like.

Furthermore, it is usually not necessary to handle bulk desiccants when making spacer frames using the spacer profiles of the invention.

Particularly preferred particulate adsorbent materials are selected from the group consisting of silica gels and/or aluminosilicates or alumosilicates, ie, in particular, natural or synthetic zeolites, molecular sieves, and the like.

The particulate adsorbent materials preferably exhibit a pore structure having pore sizes in the range of from 2 to 25 angstrom units and more preferably in the range of from 2 to 10 angstrom units.

The shape and size of the particles of adsorbent material is not of prime importance for the success of the present invention, since the time which is available for full adsorption of the content of water vapor in the space between the panes is adequate to allow even slow mechanisms of transportation toward the adsorptive particles to become effective. The use of as large a surface area of the particulate adsorbent materials as possible can achieve quicker drying, so that in a preferred embodiment of the spacer profile the adsorbent material is used, ie embedded in the matrix, in powdered form.

On the other hand, considering the above factors, it is most certainly conceivable to use particulate adsorbent materials having particle sizes in the range of up to 6 mm, and the size of the particle is in fact only limited by the dimensions of the spacer profile itself.

Preferred particle sizes are on average in the range of from 0.1 to 5 mm. The lower limit ensures that no problems can arise with dust-like particles during production, ie when using the adsorbent materials, whilst the upper limit ensures that there is still adequate packing density in the binder matrix to achieve an appropriately large adsorption capacity for water vapor.

Since the diffusion processes in the adsorbent materials, ie in the adsorbent particles, can, by reason of their pore structure, take place much faster than the diffusion processes in the binder matrix itself, the particle size is in a great number of combinations of materials of virtually no significance with respect to the speed of the process of drying the volume of air present in the space between the panes, so that the aforementioned advantages of coarse-grained adsorbent materials over the powdered form can be decisive.

The long-term drying effect of the adsorbent materials, which is of prime importance for the invention, is thus achieved more or less independently of the size and shape of the adsorbent particles so that in this respect the selection can be freely made in accordance with other factors.

The long-term effect is in the last resort dependent on there being an adequate adsorptive capacity for the specific volume of the space between the panes and the humidity of the air present therein. This adsorptive capacity is determined, on the one hand, by the amount of adsorbent material in the total mass of the spacer profile and, on the other hand and to a decisive extent however, by the degree of dryness possessed by the adsorbent materials when the insulated glazing unit is hermetically sealed with sealing material after insertion of the spacer frame.

The amount of particulate adsorbent material present in the total mass of the spacer profile is preferably from 15 to 85 wt % and more preferably from 30 to 65 wt %.

More preferably, use is made of a minimum amount of 40 wt %, and even more preferably 50 wt %, since this provides a high reserve, adequate for water vapor adsorption even in the case of very large volumes of the air space in the insulated glazing unit.

In order to achieve a quick initial drying action, the concentration of the adsorbent material in the profile may be lower near the side walls than in the regions of the first and second transverse walls. By this means more adsorbent material is available where there are short diffusion paths through the binder matrix.

The binding agents to be used in the present invention are preferably selected from the group consisting of organic and/or inorganic binding agents, examples of organic binding agents being in particular water-soluble cellulose, thermoplastic materials, and particularly polyamide, while examples of inorganic binding agents are polysilicon compounds.

The rate of water vapor diffusion can be influenced as desired by selecting specific materials for the binder matrix. This allows for adaptation of the spacer profiles of the invention to certain requirements as arise from the type of method used for manufacturing the insulated glazing units. If it is necessary, for example, for the spacer profiles to be supplied to the manufacturer of insulated glazing with the adsorbent materials already in a pre-dried state, then it will be preferred to use a binder material, such as polypropylene, in which water vapor diffusion proceeds rather slowly, so as to avoid the spacer profile from adsorbing a noticeable amount of water vapor during transportation, as would considerably reduce the remaining adsorptive capacity. Surprisingly, low diffusion rates are fully capable of achieving the desired drying effect. Since the adsorbent materials in binding agents showing low diffusion rates are protected from premature water adsorption, amounts of adsorbent material of up to 40 wt % will often suffice to give a satisfactory drying effect over a period of many years. If, for example, polypropylene is used as the material of the binder matrix, amounts of adsorbent material as low as from 20 to 30 wt %, based on the mass of the finished spacer profile, can give completely satisfactory results.

The process of water vapor diffusion into the binder materials can be described by the so-called coefficient of permeation (DIN 53122), which, for example, is in the range of from 70 to 100 $g·\mu m/m^2·d$ for polypropylene and from 2000 to 3000 $g·\mu m/m^2·d$ for PA6, as measured, in each case, at 25° C.

Materials having coefficients of permeation for water vapor at 25° C. of up to ca 500 $g·\mu m/m^2·d$ may be regarded, within the scope of the present invention, as being materials having low diffusion rates, which on the one hand give a spacer for which the manufacturing, storage and transportation conditions are less critical and for which, on the other hand, the content of adsorbent material in the binder matrix can be reduced.

Another possibility is, of course, to supply the spacer profiles to the manufacturer of insulated glazing units in a dried state packed in moisture-impermeable films, in which case the selection of the materials for the binder matrix can be made irrespective of the aforementioned factors.

If, on the other hand, a manufacturer of insulated glazing units has facilities for drying the spacer profiles virtually just before they are assembled to insulated glazing units, for example by means of a microwave oven, one will tend to use a material for the binder matrix which shows a relatively high rate of water vapor diffusion, because this accelerates the drying process and, in addition, the spacer profiles used in the insulated glazing units can then relatively rapidly adsorb the moisture in the air present in the space between the panes.

In a preferred embodiment the binding agent is used in expanded form, which on the one hand reduces the weight of the spacer profiles and, on the other hand, saves binder material, of course, and also allows faster access, ie quicker diffusion, of the water vapor present in the space between the panes to the adsorbent materials. The diffusion process is even more accelerated when the expanded structure is an open-pore expanded structure.

In addition to the main constituents binding agent and particulate adsorbent material, the material of the spacer profiles preferably also contains fillers and/or reinforcing agents and/or pigments, which serve to further improve the individual properties of the spacer profiles.

The fillers and reinforcing materials can improve the compressive strength of the materials of the spacer profile, the reinforcing materials provide higher moduli of elasticity, and the pigments make it possible to optically match the spacer profiles to the components that will be near to the spacer profiles when the insulated glazing units or wall panels are assembled.

Examples of said fillers and reinforcing agents and pigments are nanoparticles, particularly montmorillonites, liquid crystal polymers, glass fibers, carbon fibers, aramide fibers, metal fibers and/or natural fibers in the form of short, long and/or continuous fibers, mica particles, titanium(IV) oxide, wollastonite, hollow spheres of glass, metal powder, and the like.

As mentioned above, the binder material of the spacer profile is necessarily permeable to water vapor. A finished insulated glazing unit is sealed at its edge with a conventional sealing material such as polyurethane or the like. In the case of noble gas-filled insulated glazing units it is preferred also to provide an inert gas barrier layer, in order to suppress diffusion of the noble gas out of the space between the panes.

Another safeguard against the penetration of water vapor into the space between the panes, particularly with aging of the sealing material, is achieved by providing a water vapor barrier layer adjacent to the peripheral first transverse wall of the spacer profile. More preferably, the vapor barrier layer also extends into the side walls of the spacer profile bearing against the panes of glass. The same applies to the inert gas barrier layer.

The vapor barrier layer and optionally the inert gas barrier layer may be applied to the outside of the spacer profile or, alternatively and more preferably, embedded in the material of the spacer profile, which latter measure avoids the barrier layer(s) being mechanically damaged while handling the spacer profiles.

If the mechanical stability of the spacer profiles, particularly their flexural rigidity, is insufficient for existing typical processing plants for the production of spacer profile frames, reinforcing elements can, according to a further aspect of the invention, be inserted into the spacer profile for stiffening same, such elements being particularly in the form of strips, angle sections, wires, fiber bundles, nets and films of metal or a composite fiber-plastics material.

Nothing has been said, as yet, concerning the detailed geometry of the spacer profiles. The spacer profiles of the invention can be designed either as solid profiles or as hollow chamber profiles, and in the latter case one or more hollow chambers extending continuously in the longitudinal direction are provided and/or a plurality of ducts extending continuously in the longitudinal direction are distributed across the cross-section of the profile.

The hollow chambers in the spacer profile improve the insulating efficiency of the spacer profile and at the same time save material and thus make the spacer profile lighter in weight. Preferably, the hollow chambers exhibit passages providing, in the assembled state, direct communication, through the second transverse wall, between the space between the panes and the spaces in the hollow chambers. This further accelerates the adsorption process for water vapor, since the surface over which the water vapor can diffuse into the material of the spacer profile is of a distinctly larger area. For this purpose provision may be made for a large number of small-volume ducts to form the hollow chambers, said ducts being of relatively small cross-section. Alternatively, provision can be made for several voluminous chambers having a large free cross-section to be present or alternatively for several voluminous chambers to be formed which are encased by side walls in which, in turn, small-volume ducts are disposed in uniform distribution. This affords maximization of the surface area available for diffusion of water vapor and at the same time minimization of the material necessary for forming the spacer, accompanied by a distinct improvement in the thermal resistance of these spacer profiles.

In order to facilitate the production of spacer profile frames from the spacer profiles of the invention and to adapt, in particular, such production so as to approach the manufacturing technology hitherto used for metallic spacers, provision may be made for the spacer profiles of the invention to be encased entirely or in certain regions by a metal layer.

Alternatively, there is the possibility, from a different point of view, of providing an encasement of plastics material over part or all of the spacer if use is made of a plastics material which shows distinctly lower water vapor permeability than the binding agent used in the present invention to form the matrix of the spacer.

In this case the vapor barrier effect discussed above may then possibly be assumed by the encasement layer so that it is no longer necessary to provide such spacers with a separate vapor barrier layer. This also applies, in particular, to those spacer profiles of the invention which are encased by a metal layer. In the case of complete encasement of the spacer profiles, it will, of course, be necessary to provide passages through the encasement in the second transverse wall of the spacer profile facing the space between the panes so that any vapor present in this space between the panes can pass through to the vapor-permeable material of the binder matrix and thus be adsorbed and bound by the particulate adsorbent material.

In order to provide another possibility of adaptation of the drying capacity of the spacer profile of the invention, provision may be made for the hollow profile to be completely or partially filled with a separate bulk desiccant, ie a separate adsorbent material for water vapor. By this means a standard spacer profile can be used to adapt the capacity to bind water vapor to the different requirements in a simple manner, for example to the climatic zone in which the production of the spacer frame is carried out or to various volumes of the space between the panes.

Preferably, a region of the surface of the spacer profiles of the invention is treated or machined or provided with a surface structure, for example by roughening or etching. By this means particles of adsorbent material at the surface of the spacer will be uncovered, at least partially, so as to have a positive influence on the water vapor adsorption kinetics.

The present invention also relates to a spacer frame which has been produced from frame parts consisting of the spacer profile of the invention or parts thereof.

Such spacer frames can be produced, for example, by cutting to length the spacer profile of the invention and joining the resulting lengths in the corner regions, for example by means of adhesive or by welding.

Alternatively, the use of corner joiners is possible, these being in the form of pin-and-socket connectors, for example, which then connect the two adjacent lengths of spacer profile by means of adhesion, form-fit and/or friction lock. It is equally possible to make straight joiners, by means of which the frame ends can be joined together.

Alternatively, the spacer profiles may be processed in the form of continuous material to produce said frame, in which case the corner regions of the frame will be produced by heating the spacer profile. Heating can be achieved by using radiant heat, contact heat, or hot air, or by induction heating or resistance heating. Preferably, this method is carried out on hollow profiles, since in such cases buckling in the corner regions is reduced.

Preferred spacer profiles have guiding means in the surfaces of the profiles forming the outer surface, ie the first transverse wall, which guiding means may be, for example, in the form of a dovetail groove into which the corner joiners can be simply inserted. The same applies to the aforementioned straight joiners.

On the other hand, separate corner joiners and straight joiners can be produced in the form of corner elements or straight joiner elements by injection molding, transfer molding, compression molding, plunger molding, or the like, in which case material can be used as has been employed for the production of the spacer profiles themselves. To these corner joiners and/or straight joiners there are then mounted or connected straight pieces of spacer profile so as to produce an overall closed spacer frame.

The invention also relates to a process for the production of the spacer profile of the invention, in which a composition comprising a binding agent, a particulate adsorbent material for water vapor, and a processing agent is shaped to a profile and the processing agent is then completely or partially expelled from the shaped profile.

Preferably used processing agents are waxes, particularly polyethylene waxes, since these can be expelled at temperatures at which a large number of binding agents, particularly the binding agents defined above, are still thermally stable.

The proportion of processing agents in the composition used for shaping is preferably up to 35 wt %. The composition used for shaping is preferably premixed and optionally previously compounded before it is introduced into the shaping machine. Quantities of only a few percent by weight frequently yield good results.

Suitable shaping methods are extrusion, injection molding, transfer molding, compression molding, pultrusion, and plunger molding.

The process of the invention for manufacturing the spacer profile of the invention preferably makes use of a binder matrix that can be crosslinked after shaping. The crosslinking reaction can preferably take place at the same time as the expulsion of the processing agent, and this may be accompanied by concurrent drying. The drying process conditions the particulate adsorbent material distributed in the binder matrix, that is to say, it maximizes its ability to take up water vapor or, in other words, its water vapor adsorption capacity.

Surprisingly, it has been found that when use is made of organic binding agents, the tempering step required for the expulsion of the processing agent, which can take place, for example, at 200° C., increases the compressive strength of the profile to a marked degree on account of crosslinking mechanisms in the matrix.

These and other advantages of the invention are illustrated in greater detail below with reference to the drawings.

BRIEF DESCRIPTION OF THE DRAWINGS

FIGS. 2 to 15 show further variants of a spacer profile of the invention in cross-section.

DETAILED DESCRIPTION OF THE INVENTION

Figure 1:
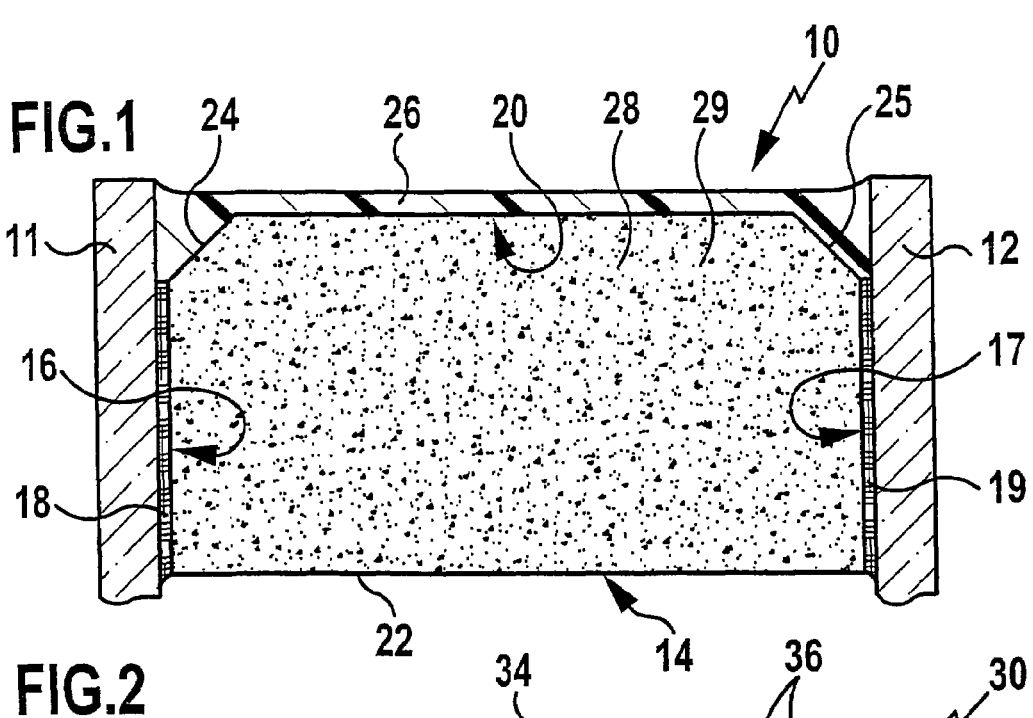
FIG. 1 is part of a sectional view of the edge region of an insulated glazing unit produced with a spacer profile of the invention.

FIG. 1 shows part of a sectional view of an insulated glazing unit designated, as a whole, by the reference numeral 10 and comprising two panes of glass 11, 12 which are held in parallel relationship at a specified distance from each other by means of a spacer profile 14. The cross-section of the spacer profile 14 is substantially based on a rectangle and the side walls 16, 17 of the spacer bear against the panes of glass 11, 12. Connection of the side walls 16, 17 to the respective pane of glass 11 or 12 is achieved by an adhesive layer 18, 19.

Between the side walls 16, 17 there extends a first transverse wall 20 and a second transverse wall 22, and these and the side walls 16, 17 substantially define the cross-section of the profile.

When the spacer profile 14 is installed in the insulated glazing unit, the transverse wall 20 is positioned at the outer edge of the insulated glazing unit 10 and is angular at its ends so as to give chamfered areas 24, 25. Once the spacer 14 has been placed between the two panes of glass 11 and 12, the edge of the insulated glazing unit 10 is then additionally coated, over its entire surface between the two panes of glass 11 and 12, with a sealing compound 26 and, if the water vapor blocking action of the sealing layer 26 is still inadequate due to the material used, an additional water vapor barrier layer or optionally, if the space between the two panes of glass 11 and 12 is filled with a noble gas, an inert gas barrier layer is provided (the two barrier layers are not shown).

The spacer profile 14 consists of a binder material, for example polyamide 6.6 in an amount of, say, 50 wt % and a particulate adsorbent material 29 (represented diagrammatically by dots) embedded in the binder matrix 28. The particulate adsorbent material 29 is used here in the form of spherical zeolite, such as has already been employed in conventional insulated glazing units. Alternatively, silica gels or other particulate adsorbent materials might be used if desired. A number of well suited adsorbent materials are sold by Grace Davison under the trade name Phonosorb.

Various exemplary recipes are given below which can be used for the production of the spacer profiles of the invention.

| Sample | Zeolite 3A (Phonosorb 551) | Polymer (polyamide 6.6) | Wax (polyolefin wax) | Modulus of elasticity N/mm$^2$ (DIN 53457) |
|---|---|---|---|---|
| 1 | 30 wt % | 56 wt % | 14 wt % | 3000 |
| 2 | 50 wt % | 40 wt % | 10 wt % | 4400 |
| 3 | 65 wt % | 28 wt % | 7 wt % | 7000 |

The wax content (polyolefin wax Licomont EK 583 sold by Ciba) is expelled at ca 220° C. after the spacer profiles have been extruded. At this temperature the polyamide 6.6 used as binder matrix remains sufficiently thermally stable.

The compressive strength of Sample 1 is, directly following extrusion, ie as long as it still contains the wax acting as processing agent, 35 N/mm$^2$, whilst that of Sample 3 is 90 N/mm$^2$. The test was carried out as specified in DIN 53454.

The aforementioned thermal aftertreatment, by means of which the wax is at least partially expelled (treatment time ca 24 h) achieves an increase in the compressive strength of all samples by ca 15 to 20%.

Processing of the blends designated as Samples 1 to 3 can be readily performed on commercial extruders, or alternatively on injection molding machines, etc. The blend components may be premixed in a foregoing mixing process and then passed to the shaping machine. Alternatively, it is possible to compound the individual components and then to process the compounded material to form a spacer profile 14 in the shaping machine.

If the shaping machine possesses appropriate functionality, there is the further possibility of feeding the individual components, namely binding agent (polyamide 6.6), adsorbent material (zeolite) and the processing agent (polyethylene wax) directly to the shaping machine and then molding them to form the product, ie the spacer profile.

If the binding agent used is water-soluble methyl cellulose, it is frequently recommended to process it in admixture with a mineral binding agent based on silane.

When using a combination of zeolite as adsorbent material and methyl cellulose and mineral silane binder (methylsiloxane ether) as binder material it is always preferred to carry out compounding in a first step at a low temperature (ca 25° C.) and then to effect shaping (by extrusion, injection molding, etc.) likewise at a low temperature (ca 25° C.) so as to produce the desired spacer profile. The processing agent used can again be a polyolefin wax, particularly polyethylene wax.

Both in the compounding process and in the subsequent shaping process care must be taken to ensure, by selecting appropriate screws and cylinders and suitably cooling the die, that the processed mixture does not become crosslinked or is at most subjected to only slight precrosslinking.

On conclusion of the shaping process, ie when extrusion of the spacer profiles is complete, the product is maintained at temperatures of, say, from 200° to 210° C., at which temperatures crosslinking proper takes place while the water present and at least a proportion of the processing agent used are expelled.

One alternative to the aforementioned polyamide as the material for forming the binder matrix is polypropylene. By reason of the substantially lower co-efficients of permeation of water vapor in polypropylene compared with polyamide, the storage conditions are less critical and the amount of adsorbent material required can be reduced. An amount of, say, 25 wt % can be entirely adequate for panes of glass spaced at a distance of from 14 to 16 mm and having an area of ca 1 m$^2$.

FIG. 2 and FIGS. 3 to 15 described below show alternative embodiments of the spacer profile of the invention, their cross-section being in each case shown only as a simple rectangular shape for the sake of simplicity.

Of course, the cross-sectional shape may be varied and have, for example, the form indicated by the periphery of the spacer profile 14 illustrated in FIG. 1.

Figure 2:
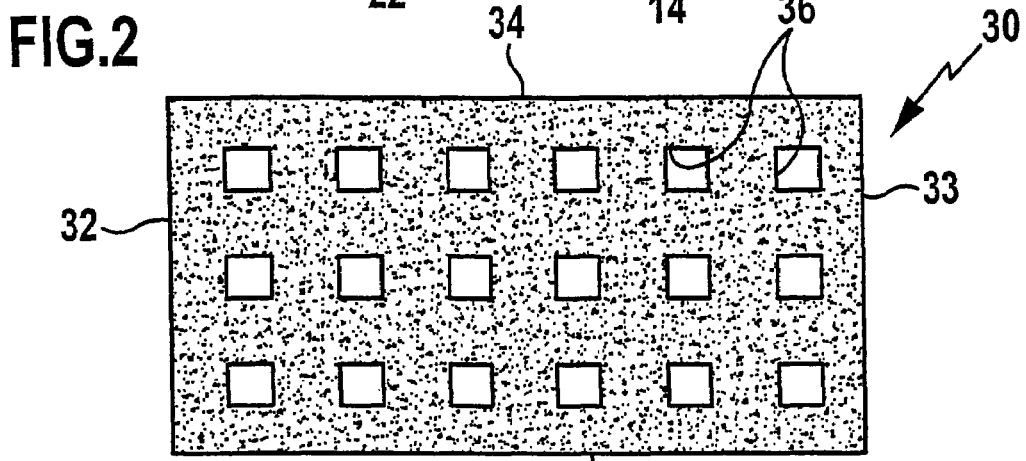

FIG. 2 illustrates a spacer profile 30, in cross-section, which has side walls 32, 33 and first and second transverse walls 34 and 35 respectively.

The composition of the material from which the spacer profile is shaped contains, like the spacer profile 14 shown in FIG. 1, a binder matrix in which there is again embedded a particulate adsorbent material.

In contrast to the solid construction of the spacer profile 14 of FIG. 1, the spacer profile 30 of FIG. 2 has a large number of ducts 36 distributed regularly across its cross-section. The ducts 36 are gas-filled, for example with air, and improve the insulating efficiency of the spacer profile 30 compared with the insulating efficiency observed on the spacer profile 14, since the heat conductivity of the gas in the ducts 36 is distinctly lower than that of the ambient matrix material with the embedded adsorbent material.

As in the case of the spacer profile 14, the drying process for the moisture present in the space between the panes and/or for solvents or plasticizers present therein takes place in that these materials diffuse through the binder matrix to reach the adsorbent materials embedded in the binder matrix where they are then bound.

The ducts 36 of the spacer profile 30 are shown in FIG. 2 as being rectangular in cross-section. Of course, the ducts 36 can, theoretically, be of any desired cross-sectional shape, ie polygonal, spherical, oval or mixed forms of such cross-sectional shapes.

Figure 3:
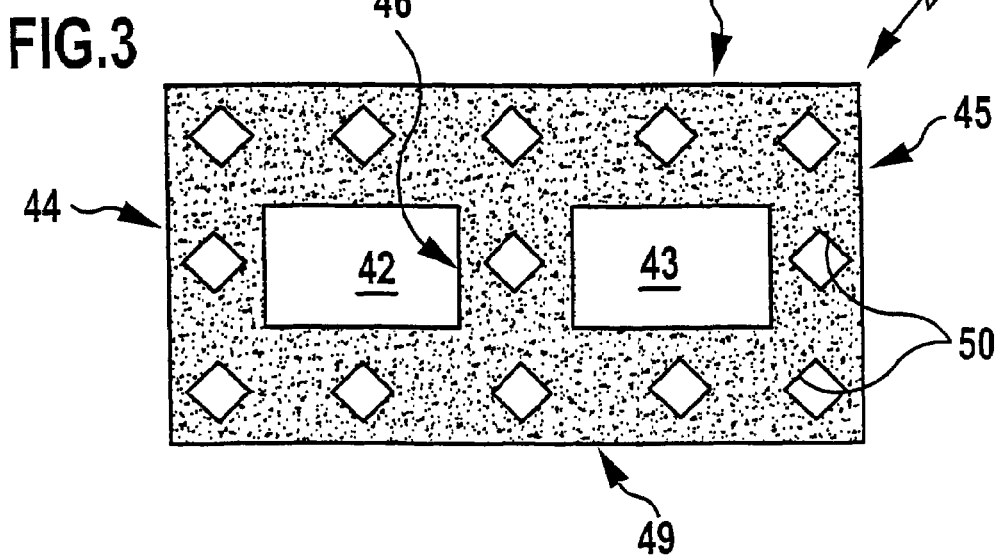

FIG. 3 shows another embodiment of a spacer profile 40 of the invention, which is in the form of a so-called hollow chamber profile having two voluminous hollow chambers 42, 43. The hollow chambers 42, 43 improve the thermal resistance of the spacer profile 40. In addition, as shown in FIG. 3, a central partition wall 46 can now be formed between the side walls 44, 45 enclosing the two hollow chambers 42, 43, and ducts 50 of small volume can be formed within the transverse walls 48, 49, these ducts corresponding to the ducts 36 of the profile 30 of FIG. 2. Only for purposes of illustration are the ducts shown here as having a rhombic cross-section, but spacer profile 40 of FIG. 3 is not confined thereto. Here again, other polygonal duct cross-sections could be used or alternatively spherical or oval or mixed forms of these shapes.

The use of such ducts 50 in its cross-section further improves the thermal resistance of the spacer profile 40.

The arrangement of ducts 50 and hollow chambers 42, 43 not only improves the thermal resistance of the profile but also creates additional surfaces via which the water vapor, solvent, plasticizer etc. can diffuse into the material of the binder matrix to reach the adsorbent materials where they are then bound. This advantage is already attained using the multi-duct system in spacer profile 30 of FIG. 2.

FIG. 4 shows another alternative embodiment of a spacer profile 54, which is in the form of a hollow chamber profile and has four parallel hollow chambers 56, 57, 58, 59. These hollow chambers are surrounded by side walls 60, 61 and transverse walls 62, 63 and are also separated from each other by means of partition walls 64, 65, 66.

The transverse wall 62 represents the first transverse wall and, when the insulated glazing unit is assembled, this wall is disposed at the edge of the insulated glazing unit. Accordingly, the transverse wall 63 is that which faces the space between the panes and has passages 67, 68, 69, 70 distributed at regular intervals across the longitudinal direction of the profile 54, which passages allow direct communication between the gas present in the hollow chambers 56, 57, 58, 59 and the gas present in the space between the panes so that the diffusion processes required for drying are accelerated into the hollow chamber volumes of the hollow chambers 56, 57, 58, 59 and thus make the overall drying process more efficient.

In FIG. 4 there are provided facultative ducts 72 in the side walls 60, 61, the transverse walls 62, 63 and the partition walls 64, 65, 66, which ducts effect, on the one hand, further improvement in the insulating efficiency of the profile 54 and, on the other hand, additionally improve the drying efficiency of the insulating profile, ie, of the adsorbent material present therein, and also increase the longitudinal stiffness of the spacer.

FIG. 5 shows a spacer profile generally designated by the reference numeral 80, which is in the form of a hollow chamber profile having a hollow chamber 82 surrounded by side walls 84, 85 and transverse walls 86, 87. Here again, ducts 88 are provided in the side walls 84, 85 and the transverse walls 86, 87, which ducts may have some other geometrical cross-section than that shown, as previously mentioned a number of times. In other respects the side walls 84, 85 and the transverse walls 86, 87 are composed of a binder matrix containing a particulate adsorbent material, for information on which reference is made to the previous embodiments.

FIG. 6 illustrates a modified embodiment of FIG. 5 comprising a spacer profile 90 in the form of a hollow profile having a hollow chamber 92. The hollow chamber 92 is surrounded by side walls 94, 95 and transverse walls 96, 97, and the transverse wall 96 faces the space between the panes when the spacer profile is installed in the insulated glazing unit and thus represents the second transverse wall, whilst the transverse wall 97 is positioned at the outer edge of the insulated glazing unit and therefore represents the first transverse wall.

The side walls 94, 95 and also 96, 97 contain a large number of ducts 98 regularly distributed across the cross-section of the spacer.

The material of which the side walls and transverse walls 94, 95, 96, 97 are formed is again a binder matrix, in which an adsorbent material for water vapor is embedded.

Compared with the embodiment shown in FIG. 5, the spacer profile 90 differs not only in that the ducts 98 have a rectangular cross-section whereas the ducts 88 show a round cross-section but also in that the chamber 92 directly communicates with the space between the panes via passages 100. As already explained with reference to FIG. 4, the passages 100 facilitate gas transfer and particularly assist the diffusion of vapor into the chamber 92 so that faster desiccation can be achieved in this case.

The vapor capacity of chamber 92 as well as that of the ducts 98 again serves to save material on the one hand and to improve the insulating efficiency of the spacer profile on the other hand. Furthermore, the larger surface area through which water vapor can diffuse into the material of the binder matrix makes further acceleration of the adsorption process possible.

Finally, FIG. 6 illustrates a particular feature to the effect that besides the first transverse wall 97 there is disposed a vapor barrier 102 (diagrammatically indicated by a dot-dash line), which can additionally function as an inert gas barrier layer or can be combined with a separate inert gas barrier layer. Such an inert gas barrier layer is recommended in cases where the space between the panes of an insulated glazing unit produced with the aid of the spacer profile 90 is filled with noble gas, in order to prevent the noble gas from escaping from the space between the panes during the years of use of the insulated glazing unit, which would diminish the insulating efficiency.

FIG. 7 shows another modification of the embodiment of FIG. 5 in the form of a spacer profile 110, which is likewise a hollow profile having a chamber 112 surrounded by side walls 114, 115 and transverse walls 116, 117. In the side walls 114, 115 and also in the transverse walls 116, 117 there are provided ducts 118, which serve the same purpose as the ducts 88 in the spacer profile 80 of FIG. 5.

The spacer profile of FIG. 7 is additionally provided with a vapor barrier layer 120 (shown diagrammatically as a dot-dash line) on the first transverse wall 117 and also on the side walls 114, 115, such barrier layers serving to prevent moisture present in the ambient air from diffusing into the interior of the insulated glazing unit. As previously explained in connection with FIG. 6, the vapor barrier layer can be combined with an inert gas barrier layer in cases where spacer profile 110 is used for the production of noble gas-filled insulated glazing units.

FIG. 8 shows a variant of the spacer profile of FIG. 7 in the form of a spacer profile 130, which is again in the form of a hollow profile having a chamber 132 surrounded by side walls 134, 135 and transverse walls 136, 137. In the side walls 134, 135 and transverse walls 136, 137 there are provided ducts 138 in regular distribution, which ducts can, of course, have some other cross-section than the round cross-section shown, as often pointed out above.

Unlike the embodiment shown in FIG. 7, the spacer profile 130 of FIG. 8 has a vapor barrier 140, which is in this case embedded in the transverse wall 137 and in the side walls 134, 135 and is thus well protected from mechanical damage. Attention may be called to the fact that the dimensions in all of the Figures and, in particular, the dimensions in FIG. 8 and, in particular, the arrangement of the vapor barrier layer 140 and its distance from the outer surfaces of side walls 134, 135 and from the first transverse wall 137 are only illustrated diagrammatically and said layer can, of course, be much nearer to the various wall surfaces. Neither is it absolutely necessary for ducts 138 to be provided between the vapor barrier layer 140 and the outer surface of the respective wall. On the contrary, the ducts may all be in the region protected by the vapor barrier layer 140.

FIG. 9 illustrates another variant of the spacer profile of the invention and shows a spacer profile 150 which is in the form of a solid body surrounded on virtually all sides by an encasement 152. Encasement 152 has passages 156 only in transverse wall 154 facing the space between the panes, through which passages water vapor diffuses from the space between the panes to a core 158 of profile 150 consisting of a binder matrix material and particles of adsorbent material embedded therein.

If encasement 152 consists of a metal sheet or a metal foil, it is generally unnecessary to provide an additional vapor barrier layer. Instead of an encasement 152 of metal use can be made of one of plastics material, particularly an encasement of composite material, which may have similar properties. In all cases encasement 152 can be used for the purpose of increasing the longitudinal stiffness of spacer profile 150 so that the sag of spacer profile 150 is less than in the case of, for example, spacer profile 14 shown in FIG. 1.

FIG. 10 shows a modified embodiment of a spacer profile 160, in which ducts 164 pass right through core 162 consisting of a binder matrix material including embedded particles of adsorbent material. Core 162 of spacer profile 160 is surrounded on its side walls 166, 167 and its first transverse wall 168 by an encasement 170 which, when installed in the glazing unit, leaves a second transverse wall 172 of core 160 freely exposed to the space between the panes.

Thus the entire surface of transverse wall 172 is available for the diffusion process allowing water vapor to diffuse into core 160.

At the same time, the stiffening of profile 160 caused by encasement 170 is frequently quite sufficient to make spacer profile 160 suitable for processing in conventional devices for processing metal spacers.

The heat flow through side walls 166, 167 via 168 can be diminished by providing slits in the encasement 170 preferably near the edges of the spacer profile.

Similarly, a spacer profile 180 as illustrated in FIG. 11 has a core 182 that is surrounded on substantially three-sides by an encasement 184, ie, the latter encloses the side walls 186, 187 and a transverse wall 188. The core 182 is again in the form of a hollow profile having a chamber 190 which communicates through passages 192 with the space between the panes.

In side walls 186, 187, transverse wall 188, and the other transverse wall 194, there are provided ducts 196 having the same function as described above for the previous embodiments.

In the interior of chamber 190 there are disposed additional amounts of desiccant in bulk form (particles 198), and the capacity of hollow chamber 190 determines the additional desiccating effect that can be achieved with this spacer profile 180.

The encasement around the profile 180 shown in FIG. 11 differs from encasement 170 around profile 160 in FIG. 10 in that the encasement extends beyond lateral surfaces 186, 187 to engage the two marginal areas of transverse wall 194. By this means mechanical fixing can be produced without additional measures, such as adhesive bonding, which facilitates the production of such sections. Here again, the encasement can be made of metal or reinforced plastics and serves to increase the flexural rigidity of this profile or to improve its stickability.

FIG. 12 shows another fundamental variant of the spacer profile 200 of the invention, which is again in the form of a hollow profile comprising a hollow chamber 202 surrounded by side walls 204, 205 and transverse walls 206, 207. Side walls 204, 205 and transverse walls 206, 207 are provided with ducts 208 and the sides of transverse wall 207 are provided with a vapor barrier layer 210 (shown diagrammatically as a dot-dash line), which may optionally be combined with an inert gas barrier layer.

Metal strips 212, 213 are inserted in side walls 204, 205 flush with their outer surface to serve as stiffeners for profile 200.

Figure 13:
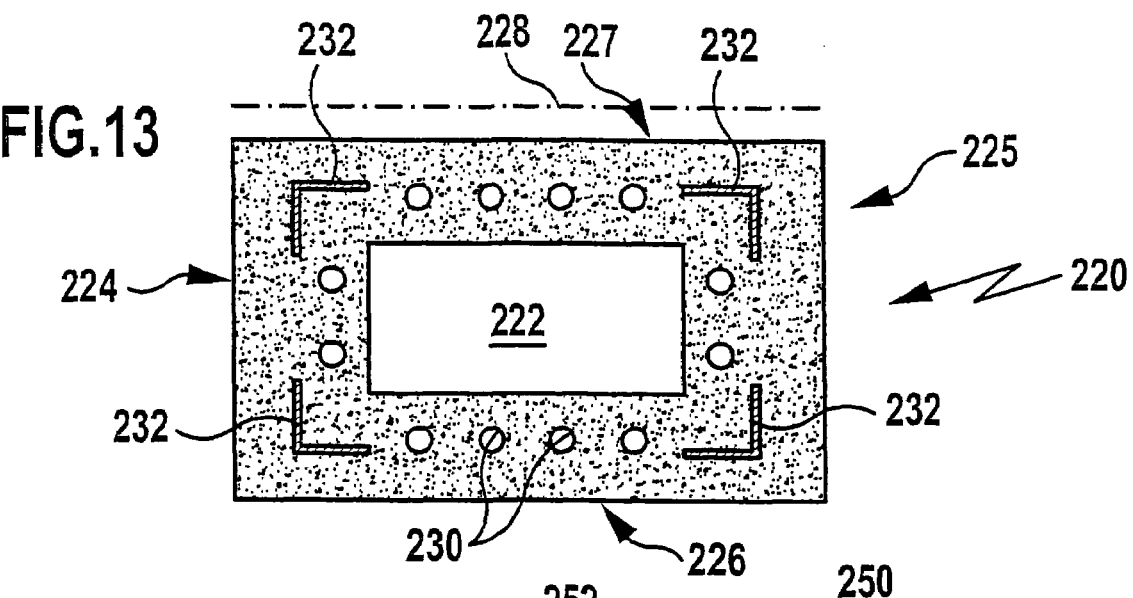

FIG. 13 shows an alternative embodiment to profile 200 of FIG. 12, in which a spacer profile 220 is again in the form of a hollow profile having a hollow chamber 220 surrounded by side walls 224, 225 and transverse walls 226, 227.

The outer first transverse wall 227 is provided with a vapor barrier layer 228 (shown diagrammatically as a dot-dash line), which may optionally be combined with an inert gas barrier layer.

Ducts 230 are provided in the side walls 224, 225 as well as in the transverse walls 226, 227.

In the corner regions of profile 220 there are provided angle sections 232, preferably of metal or a composite material, for the purpose of stiffening the section 220.

Figure 14:
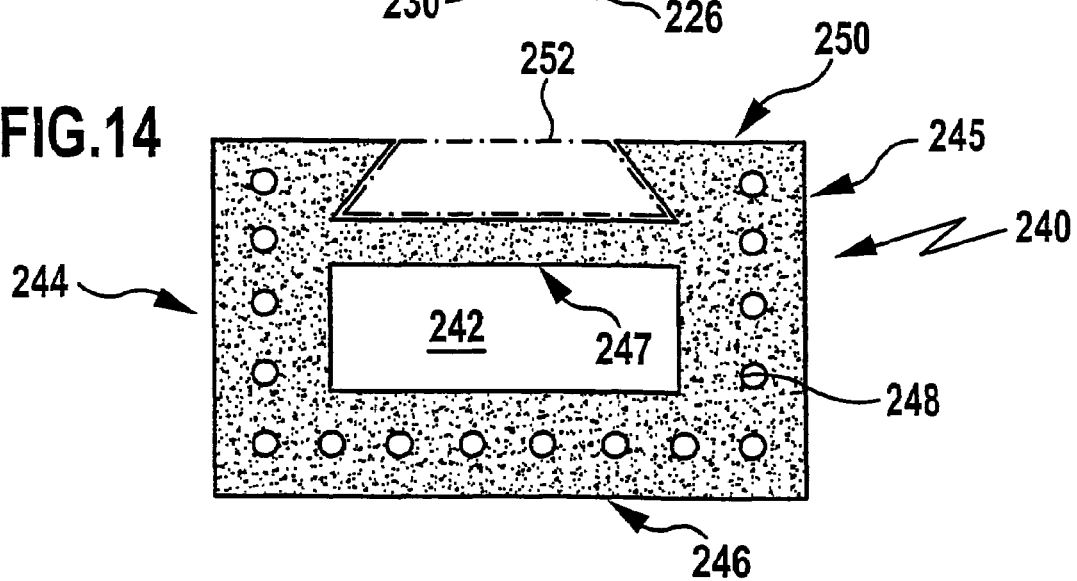

FIG. 14 illustrates another variant of a spacer profile 240 of the invention, which is likewise in the form of a hollow profile having a hollow chamber 242. Hollow chamber 242 is surrounded by side walls 244, 245 and transverse walls 246, 247, these containing ducts 248. The Figure shows no ducts 248 in the transverse wall 247, but the person skilled in the art will appreciate that ducts 248 could be accommodated therein when the thickness of transverse wall 247 is appropriately dimensioned. Alternatively, of course, ducts of smaller cross-sectional area can be provided, and the invention is not, of course, confined to the use of ducts of identical cross-sectional area or shape but, as the person skilled in the art will readily appreciate, allows for the use of arbitrary combinations and modifications within the limitations set by the basic structure of the profile.

In contrast to the embodiments of spacer profiles discussed above, profile 240 is provided with a dovetail groove 250 on the outer surface of its transverse wall 247, into which a corner or straight joiner 252 (indicated by dot-dash lines) can be inserted. Corner joiners serve to connect cut-to-length frame parts of the spacer profile to each other via a plug connector and to hold them in place, whilst straight joiners are suitable for linearly connecting lengths of spacer profile 240 to each other so as to assemble the spacer profile frame 240.

The corner joiner 252 can be held in the dovetail groove 250 with a press fit or force fit or alternatively held in position therein by adhesive means.

Figure 15:
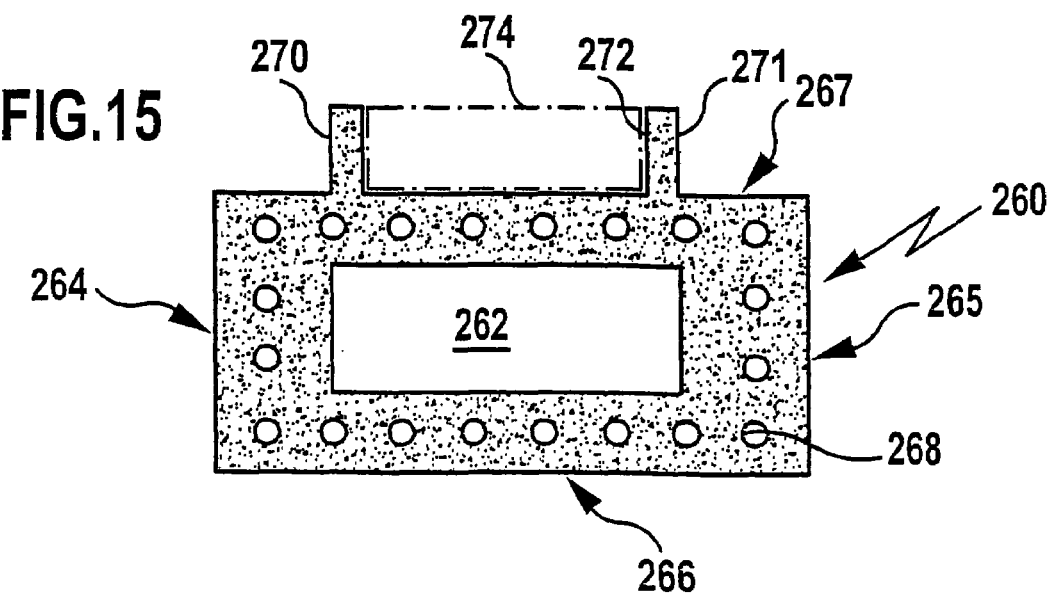

A variant of the embodiment of FIG. 14 is illustrated in FIG. 15 in which a spacer profile 260 has a hollow chamber 262 that is surrounded by side walls 264, 265 and transverse walls 266, 267. In the transverse and side walls 264, 265, 266, 267 there are provided ducts 268 at regular intervals.

On the outer surface of the first transverse wall 267, which is adjacent to the edge region of an insulated glazing unit when assembled, there are provided vertically projecting parallel spaced fins 270, 271 extending in the longitudinal direction of the profile. These fins 270, 271 define a slot 272 into which a corner joiner or straight joiner having the same function as that described with respect to FIG. 14 can be used (part 274 indicated by dot-dash lines).

It will be apparent to the person skilled in the art that the particular features described above with respect to individual embodiments can be readily applied to other embodiments with or without modification. In the same way, all information given on the benefits of individual embodiments similarly applies to other embodiments employing the same features of the spacer profiles even if this is not specifically mentioned in each individual case. This applies not only to the cross-section of the ducts passing right through the profiles but also to their advantages, and it equally applies to the passages providing a means of communication between the hollow chambers of the individual profiles and the space between the panes. Again, to mention yet another example, this applies to the additional bulk desiccator particles with which the hollow chambers can be filled.

In the case of the specific spacer profiles described above that are in the form of hollow chamber profiles, wall thicknesses of from only 1 to 2 mm suffice to provide adequate stability. The volumes in the walls of the hollow section which are available for the accommodation of adsorbent material are likewise adequate, so that in the case of these embodiments also there is no need for additional filling of the hollow chambers with particles of adsorbent material, whilst the amount thereof in the walls of the hollow chamber profiles is preferably from 20 to 30 wt % particularly when binder matrix materials are used which show relatively small coefficients of permeation for water vapor, as in the case of polypropylene, for example.

The invention claimed is:

1. A spacer profile for an insulated glazing unit, which profile has a cross-section based on a rectangular shape, is provided with two parallel spaced side walls which, when said insulated glazing unit is assembled, will be placed against the panes of glass to be kept apart from each other, and is further provided with first and second transverse walls which extend between said side walls and of which the first will be adjacent to the edge of the glazing unit and the second will face the space between the panes, the spacer profile having a plurality of ducts extending in the longitudinal direction and distributed over the cross-section of the spacer profile, wherein said spacer profile comprises a binder matrix and, embedded therein, a particulate adsorbent material for water vapor, and the binder matrix is permeable to water vapor, the spacer profile further comprising one or more hollow chambers extending in the longitudinal direction, the plurality of ducts being smaller in volume than the at least one hollow chamber.

2. A spacer profile as defined in claim 1, wherein said particulate adsorbent material is selected from the group consisting of silica gels and aluminosilicates.

3. A spacer profile as defined in claim 1, wherein said particulate adsorbent material has a microporous structure with pore sizes ranging from 2 to 25 angstrom units and preferably from 2 to 10 angstrom units.

4. A spacer profile as defined in claim 1, wherein said particulate adsorbent material is embedded in the matrix in powdered form.

5. A spacer profile as defined in claim 1, wherein said particulate adsorbent material comprises particles having a particle size of up to 6 mm.

6. A spacer profile as defined in claim 5, wherein said particulate adsorbent material comprises particles having an average particle size in the range of 0.1 to 5 mm.

7. A spacer profile as defined in claim 1, wherein the proportion of said particulate adsorbent material in the total mass of said spacer profile is from 15 to 85 wt % and preferably from 30 to 65 wt %.

8. A spacer profile as defined in claim 7, wherein the proportion of said adsorbent material in the total mass of said spacer profile is 40 wt % or more and preferably 50 wt % or more.

9. A spacer profile as defined in claim 1, wherein the content of said adsorbent material in the side walls is less than in the regions of said first and second transverse walls.

10. A spacer profile as defined in claim 1, wherein said spacer profile is an extrudate.

11. A spacer profile as defined in claim 10, wherein said binder matrix is selected from the group consisting of organic binding agents, inorganic binding agents, water-soluble methyl cellulose, thermoplastic materials, polyamide, polypropylene, and polysilicon compounds.

12. A spacer profile as defined in claim 1, wherein embedded in the binder matrix is a material selected from the group consisting of fillers, reinforcing agents, pigments, and UV stabilizers.

13. A spacer profile as defined in claim 12, wherein said fillers, reinforcing agents, and pigments are selected from the group consisting of nanoparticles, liquid crystal polymers, glass fibers, carbon fibers, aramide fibers, natural fibers in the form of at least one of short, long, and continuous fibers, metal fibers in the form of at least one of short, long, and continuous fibers, mica, titanium(IV) oxide, wollastonite and hollow spheres of glass.

14. A spacer profile as defined in claim 1, wherein the binder matrix is expanded.

15. A spacer profile as defined in claim 14, wherein said expanded binder matrix has an open-pore expanded structure.

16. A spacer profile as defined in claim 1, wherein said spacer comprises a vapor barrier layer and optionally an inert gas barrier layer adjacent to said first transverse wall.

17. A spacer profile as defined in claim 16, wherein said vapor barrier layer and optionally said inert gas barrier layer extend to the side walls bearing against the insulated glazing unit.

18. A spacer profile as defined in claim 16, wherein said vapor barrier layer and optionally said inert gas barrier layer are embedded in the profiled element.

19. A spacer profile as defined in claim 1, wherein said spacer profile comprises reinforcing elements for stiffening the same, the reinforcing elements selected from the group consisting of tapes, wires, angle sections, nets, films, or fibrous bundles of metal and composite fiber-plastics materials.

20. A spacer profile as defined in claim 1, wherein said hollow chamber(s) have passages in said second transverse wall at regular intervals.

21. A spacer profile as defined in claim 1, wherein said spacer contains one or more voluminous chambers surrounded by hollow chamber walls and also comprises a plurality of small volume ducts distributed within the hollow chamber walls.

22. A spacer profile as defined in claim 1, wherein said spacer is completely or partially encased by a plastics material or a metallic material.

23. A spacer profile as defined in claim 1, wherein additional bulk desiccant is present in the hollow chambers of said spacer profile.

24. A spacer profile as defined in claim 1, wherein the binder matrix is selected from materials having coefficients of permeation for water vapor that are less than or equal to 500 g·µm/m²·d.

25. A spacer profile as defined in claim 24, wherein said binder matrix consists predominantly of polypropylene and that the content of adsorbent material is from 15 to 40 wt %, based on the weight of said spacer profile.

26. A spacer profile as defined in claim 1, wherein at least one surface has been processed such that particles of adsorbent material present in the binder matrix are at least partially exposed at the surface of said spacer profile.

27. A spacer profile frame for insulated glazing units, produced from frame parts made of spacer profile as defined in claim 1.

28. A spacer profile frame as defined in claim 27, wherein said frame parts, when necessary, are cut to length from endless profiled material and are joined to each other at the frame corners by means of welding or adhesion.

29. A spacer profile frame as defined in claim 28, wherein said frame parts are joined at the frame corners by means of corner joiners.

30. A spacer profile frame as defined in claim 27, wherein said corner joiners are connected to the frame parts by an adhesive bond, by a form-fit and/or by a friction lock.

31. A spacer profile frame as defined in claim 27, wherein the corner regions of said frame are produced by means of bending, the areas to be bent being heated before the bending operation and optionally also during the bending operation, particularly by means of the application of radiant heat, contact heat, hot air, induction heat or resistance heat.

32. A spacer profile frame as defined in claims 27, wherein the outer surface of the frame-forming spacer profile has guide elements for the accommodation of corner and straight joiners.

33. A spacer profile frame as defined in claim 27, wherein said corner joiners are made of substantially the same material as the spacer profile itself by injection molding, transfer molding, compression molding, or plunger molding.

34. A process for the production of a spacer profile as defined in claim 1, characterized by a shaping step, in which a composition comprising a binding agent that is permeable to water vapor, a particulate adsorbent material for water vapor in an amount of from 15 to 40 wt %, based on the weight of said binding agent and adsorbent material, is shaped to a profile in a shaping machine.

35. A process for the production of a spacer profile as defined in claim 34, wherein said composition contains a processing agent, particularly a wax, which is completely or partially expelled in a subsequent step.

36. A process for the production of a spacer profile as defined in claim 35, wherein said wax is a polyethylene wax.

37. A process for the production of a spacer profile as defined in claim 35, wherein the proportion of said processing agent in the total composition used for shaping said spacer profile is up to 35 wt %.

38. A process as defined in claim 34, wherein said composition is premixed or compounded before it enters said shaping machine.

39. A process as defined in claims 34, wherein the shaping step is realized by an extrusion, injection molding, transfer molding, compression molding, pultrusion, or plunger molding process.

40. A process as defined in claim 34, wherein following shaping of the spacer profile the binding agent is crosslinked, optionally accompanied by expulsion of the processing agent used and optionally combined with drying of said spacer profile.

41. A process as defined in claim 34, wherein at least one surface of the profile is processed in order to at least partially expose particles of adsorbent material in the binder matrix which are present at the surface of the profile.

42. A spacer profile as defined in claim 1, wherein said spacer profile is a pultrudate.

\* \* \* \* \*